(12) United States Patent
Jacobson et al.

(10) Patent No.: US 7,551,618 B2
(45) Date of Patent: Jun. 23, 2009

(54) STACK BYPASS APPLICATION PROGRAMMING INTERFACE

(75) Inventors: Paul Jacobson, Brookline, MA (US); Julia Ravalski, Waltham, MA (US); Olaf Schiller, Schlangen (DE)

(73) Assignee: Digi International, Minnetonka, MN (US)

( * ) Notice: Subject to any disclaimer, the term of this patent is extended or adjusted under 35 U.S.C. 154(b) by 547 days.

(21) Appl. No.: 11/148,954

(22) Filed: Jun. 9, 2005

(65) Prior Publication Data

US 2006/0280185 A1     Dec. 14, 2006

(51) Int. Cl.
*H04L 12/28* (2006.01)

(52) U.S. Cl. ........................ 370/392; 709/238
(58) Field of Classification Search ........................ None
See application file for complete search history.

(56) References Cited

U.S. PATENT DOCUMENTS

| | | | |
|---|---|---|---|
| 6,356,949 B1 * | 3/2002 | Katsandres et al. | 709/238 |
| 6,363,421 B2 * | 3/2002 | Barker et al. | 709/223 |
| 6,768,738 B1 * | 7/2004 | Yazaki et al. | 370/392 |
| 6,889,258 B1 * | 5/2005 | Liu et al. | 709/245 |
| 6,985,722 B1 * | 1/2006 | Snelgrove et al. | 455/420 |
| 7,031,267 B2 * | 4/2006 | Krumel | 370/255 |
| 7,401,120 B2 * | 7/2008 | Walbeck et al. | 709/203 |
| 2003/0035430 A1 * | 2/2003 | Islam et al. | 370/401 |
| 2005/0068913 A1 * | 3/2005 | Tan et al. | 370/310 |
| 2006/0075119 A1 * | 4/2006 | Hussain et al. | 709/227 |
| 2006/0165108 A1 * | 7/2006 | Uysal | 370/412 |

* cited by examiner

*Primary Examiner*—Phirin Sam
(74) *Attorney, Agent, or Firm*—Kenneth F. Kozik

(57) ABSTRACT

Methods and apparatus, including computer program products, for a stack bypass application programming interface (API). A stack bypass API for receipt of a packet includes a registration function that registers an application selectable filter function and a receive function that are used during operation by an Ethernet driver.

5 Claims, 2 Drawing Sheets

STACK BYPASS APPLICATION PROGRAMMING INTERFACE

BACKGROUND

The present invention relates to data processing by digital computer, and more particularly to a stack bypass application programming interface (API).

Transmission Control Protocol/Internet Protocol (TCP/IP), for example, is the basic communication language or protocol of the Internet. It can also be used as a communications protocol in a private network (either an intranet or an extranet). Other protocols include User Datagram Protocol/Internet Protocol (UDP/IP).

Conventional TCP/IP communication incurs a high cost to copy data between kernel buffers and user process virtual memory at the socket layer. This has motivated development of techniques to reduce or eliminate data copying.

SUMMARY

The present invention provides methods and apparatus, including computer program products, for a stack bypass application programming interface (API).

In an aspect, the invention features a stack bypass application programming interface (API) for receipt of a packet including a registration function that registers an application selectable filter function and a receive function that are used during operation by an Ethernet driver.

In embodiments, the filter function can be user-customizable and can return a response. The response can cause the packet to be discarded. The response can cause the packet to be forwarded to an Internet Protocol (IP) stack. The response can cause the packet to be removed from a direct memory access (DMA) ring in the Ethernet driver and sent to the receive function.

The receive function can process the packet. The receive function can pass the packet on to a thread. The receive function can place the packet in a queue for future processing.

In another aspect, the invention features a method of receiving a network packet including enabling a registration function that registers an application selectable filter function and receive function with an Ethernet driver, calling a filter function, the filter function returning a state, discarding the packet if the returned state can be discard, forwarding the packet to an Internet Protocol (IP) stack if the returned state can be forward, and removing the packet and calling a receive function if the returned state can be remove.

In embodiments, the receive function can process the packet. The receive function can pass the packet on to a thread. The receive function can place the packet in a queue for future processing.

The invention can be implemented to realize one or more of the following advantages.

This invention enables very high throughput of data on network processors.

This invention enables the caller the ability to filter on any aspect of the Ethernet packet.

The amount of software needed to get from the receipt of an Ethernet packet, to the place where the application processes the packet, is reduced extensively. The amount of software needed to process an application's request to send the packet, to where the packet is actually sent, is reduced extensively.

Many TCP/IP stack vendors offer a zero copy mechanism, but this API reduces processing needs.

One implementation of the invention provides all of the above advantages.

Details of one or more implementations are set forth in the description below. Other features, aspects, and advantages may be apparent from the description.

BRIEF DESCRIPTION OF THE DRAWINGS

FIG. 2 is a block diagram.
Like reference numbers and designations in the various drawings indicate like

DETAILED DESCRIPTION

Figure 1:
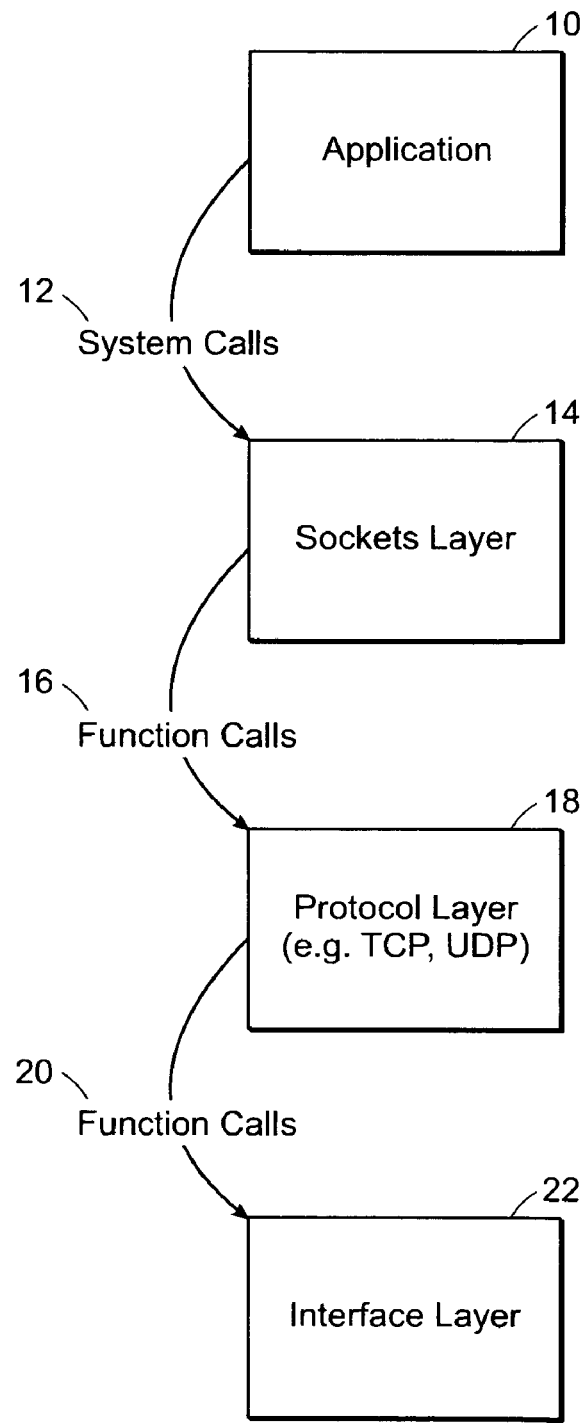
FIG. 1 is a block diagram.

As shown in FIG. 1, a data path in a protocol stack includes an application 10 passing system calls 12 to a sockets layer 14. The sockets layer 14 makes function calls 16 to a protocol layer 18, such as TCP or UDP. The protocol layer 18 makes function calls 20 to an interface layer 22, e.g., Ethernet driver.

Figure 2:
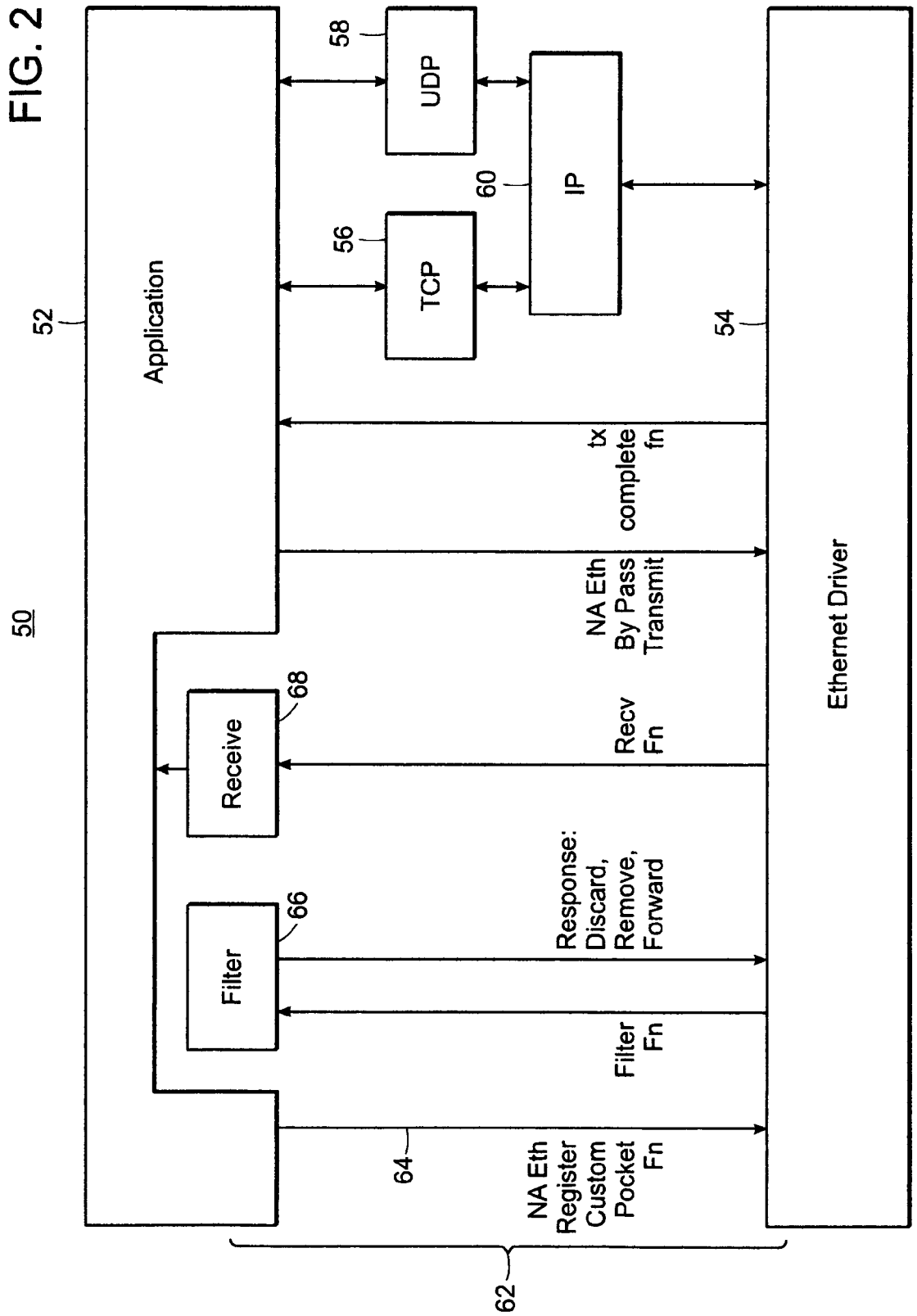

As shown in FIG. 2, a data path diagram 50 includes an application 52, an Ethernet driver 54, a TCP layer 56, a UDP layer 58, an IP layer 60, and a stack bypass application programming interface (API) 62. The TCP layer 56 and IP layer 60 enable a TCP/IP stack while the UDP layer 58 and IP layer 60 enable a UDP/IP stack.

The stack bypass API 62 includes a registration function 64, e.g., NAEthRegisterCustomPacketFn, which registers an application selectable filter and receive functions, 66 and 68, respectively, which are used during operation by the Ethernet driver 54.

In operation, on a receive-side, when a packet of data comes in, the Ethernet driver 54 immediately calls the filter function 66. The filter function 66 is user-customizable to enable filtering of any parts of the packet, such as a packet header, IP header, TCP header, and so forth. The filter function 66 responds in one of three ways, i.e., "discard," "receive" or "forward;" this functionality is resident in the Ethernet driver 54, where direct memory accesses (DMAs) occur.

If the response is "forward," the packet is forwarded to the TCP/IP stack (or UDP/IP stack).

If the response is "discard," then processing on the packet is complete, e.g., the packet is left in the DMA ring of the Ethernet driver 54.

If the response is "receive," the stack bypass API 62 continues further processing on the packet in the receive function 68, i.e., the packet is removed from the DMA ring and the Ethernet driver 54 calls the user-customizable receive function 68. Processing in the receive function 68 can include, for example, immediate processing of the packet, passing the packet to a thread, placing the packet in a queue for future processing, and so forth.

On a transmit-side, the application 52 calls the Ethernet driver 54, e.g., NAEthBypassTransmit, to transmit a packet, and pass an optional function call back, e.g., TxCompleteFn, to signal to the application 52 completion of the packet transmit.

Although only a few embodiments have been described in detail above, other modifications are possible. Actions do not require the particular order described, or sequential order, to achieve desirable results. In certain implementations, multitasking and parallel processing may be advantageous.

What is claimed is:

1. A stack bypass application programming interface (API) for receipt of a packet comprising a registration function that registers an application selectable filter function and a receive function that are used during operation by an Ethernet driver, the filter function returning a response and the response causing the packet to be removed from a direct memory access (DMA) ring in the Ethernet driver and sent to the receive function.

2. A method of receiving a network packet comprising:
enabling a registration function that registers an application selectable filter function and receive function with an Ethernet driver;
calling a filter function, the filter function returning a state;
discarding the packet if the returned state is discard; forwarding the packet to an Internet Protocol (IP) stack if the returned state is forward; and
removing the packet and calling a receive function if the returned state is remove.

3. The method of claim 2 wherein the receive function processes the packet.

4. The method of claim 2 wherein the receive function passes the packet on to a thread.

5. The method of claim 2 wherein the receive function places the packet in a queue for future processing.

* * * * *